(12) United States Patent
Pan et al.

(10) Patent No.: US 10,772,303 B2
(45) Date of Patent: Sep. 15, 2020

(54) EYE-FRIENDLY GREEN-BLUE MIXED LED LIGHTING METHOD AND SYSTEM FOR CHICKEN HOUSES

(71) Applicant: ZHEJIANG UNIVERSITY, Hangzhou (CN)

(72) Inventors: Jinming Pan, Hangzhou (CN); Yefeng Yang, Hangzhou (CN); Xuke Li, Hangzhou (CN); Jinsong Jiang, Hangzhou (CN); Fengjia Dai, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1116 days.

(21) Appl. No.: 14/760,317

(22) PCT Filed: Jan. 14, 2014

(86) PCT No.: PCT/CN2014/070564
§ 371 (c)(1),
(2) Date: Jul. 10, 2015

(87) PCT Pub. No.: WO2015/106380
PCT Pub. Date: Jul. 23, 2015

(65) Prior Publication Data
US 2016/0270375 A1  Sep. 22, 2016

(51) Int. Cl.
*A01K 31/18* (2006.01)
*A01K 31/19* (2006.01)

(52) U.S. Cl.
CPC .............. *A01K 31/19* (2013.01); *A01K 31/18* (2013.01); *A01K 2207/35* (2013.01); *A01K 2227/30* (2013.01)

(58) Field of Classification Search
CPC ...... A01K 31/00; A01K 31/005; A01K 31/18; A01K 31/19; A01K 45/00; A01K 2207/35
See application file for complete search history.

(56) References Cited

U.S. PATENT DOCUMENTS

| | | | |
|---|---|---|---|
| 6,766,767 B2 * | 7/2004 | El Halawani | A01K 45/00 119/174 |
| 8,657,463 B2 * | 2/2014 | Lichten | F21S 8/063 362/217.05 |
| 9,578,858 B2 * | 2/2017 | Li | A01K 31/002 |
| 10,237,956 B2 * | 3/2019 | Grajcar | A01K 31/00 |

(Continued)

*Primary Examiner* — Monica L Barlow
*Assistant Examiner* — Michael A. Fabula
(74) *Attorney, Agent, or Firm* — Zhihua Han; Wen IP LLC

(57) ABSTRACT

The invention relates to eye-friendly green-blue mixed LED lighting methods and systems for chicken houses. In a chicken house, an evenly-distributed cyan light environment may be created for rearing broiler chickens. The chicken house may include mixed LED lamps associated with the cyan light environment, and the mixed LED lamp may be formed by combining green LED beads and blue LED beads on a lighting fixture with a mixing proportion of from about 0.2 to about 5. The mixed LED lamps may be used for about 24-hour lighting in the first three days of the breeding period. From the fourth day of the breeding period, the daily lighting duration may be progressively decreased by about one hour every day. The mixed LED lamps may be evenly arranged in the chicken house to form a square array.

10 Claims, 19 Drawing Sheets

(56) References Cited

U.S. PATENT DOCUMENTS

| | | | | |
|---|---|---|---|---|
| 2012/0002408 A1* | 1/2012 | Lichten | ............ | A01G 7/045 |
| | | | | 362/218 |
| 2012/0186524 A1* | 7/2012 | Grajcar | ............ | A01K 31/005 |
| | | | | 119/6.8 |
| 2013/0016506 A1* | 1/2013 | Odom, Jr. | ............ | A01K 31/18 |
| | | | | 362/231 |
| 2013/0229104 A1* | 9/2013 | Green | ............ | F21V 29/70 |
| | | | | 313/46 |
| 2013/0271022 A1* | 10/2013 | Pan | ............ | H05B 33/0815 |
| | | | | 315/210 |
| 2015/0156992 A1* | 6/2015 | Kasahara | ............ | A01K 45/00 |
| | | | | 426/2 |
| 2015/0351325 A1* | 12/2015 | Shelor | ............ | H05B 45/22 |
| | | | | 47/58.1 LS |
| 2016/0323960 A1* | 11/2016 | Grajcar | ............ | H05B 47/155 |

* cited by examiner

EYE-FRIENDLY GREEN-BLUE MIXED LED LIGHTING METHOD AND SYSTEM FOR CHICKEN HOUSES

This application is a national stage application of International application number PCT/CN2014/070564, filed Jan. 14, 2014, titled "An Eye-friendly Green-blue Mixed LED Lighting Method and System for Chicken Houses," which is hereby incorporated by reference in its entirety.

TECHNICAL FIELD

The present disclosure relates to lighting methods and systems for chicken houses, and more particularly, to eye-friendly green-blue mixed LED lighting methods and systems for chicken houses.

BACKGROUND

Light is one of the important environmental conditions for poultry's growth and development. Facts have proven that lighting duration, light intensity, and especially the color of light have some effect on poultry's growth, development and reproduction which affects poultry's daily weight gain, sexual maturation, laying rate, etc. In view of this, numerous experts are engaged in the research of the effects of the single-color light on poultry and have gained some achievements. For example, compared with other single-color light, green light has more significant effects on the overall increase in chicken muscle fiber and testosterone levels than red light and white light; therefore green light causes a significant gain in earlier stage and a reduced gain in the growth performance of broiler chickens in later stage. So it has a significant effect on the growth performance and chicken quality of broiler chickens; blue light can promote the increase in chicken muscle fiber and testosterone levels in early stage (0~21 day old), but cause a significant gain in later stage. So blue light has a significant effect on the gain in the growth performance of broiler chickens. In an application of actual production, a new lighting equipment of red, light blue and green single-color lamp series developed by a Netherlands company Gasloc meets production requirements of various kinds of poultry with over-10-thousand-hour service life. This series of lighting equipment has won high favor in a number of countries in the world for its successful application.

However, the pure blue or green single-color light is mainly provided to increase production performance in rearing of broiler chickens. But blue or green single-color light is hard on human eyes, and even induces many non-visual effects, such as rhythm disturbance and abnormal melatonin secretion. Mixing blue light and green light may be good for human eyes and may promote growth of broiler chickens.

SUMMARY

The present disclosure provides eye-friendly green-blue mixed LED lighting methods and systems for chicken houses.

The invention includes the following methods and/or systems.
1. An Eye-Friendly, Green-Blue Mixed LED Lighting Method for Chicken Houses.

In a chicken house, an evenly-distributed cyan light environment may be created for rearing broiler chickens. There may be mixed LED lamps in the cyan light environment and the mixed LED lamp is formed by combining green LED and blue LED on one lighting fixture with a mixing proportion of from about 1:5 to about 5:1. In the first three days of the breeding period, the mixed LED lamps may be used for 24-hour lighting and the illuminance is the illuminance value required for the welfare rearing of broiler chickens; from the fourth day of the breeding period. The daily lighting duration of the mixed LED lamps may be progressively decreased by about 1 hour (h) every day from about 23 h to about 16 h, and the illuminance is half the illuminance value required for the welfare rearing of broiler chickens.

The mixed LED lamps in the cyan light environment are arranged as below

1) Four mixed LED lamps may be mounted in a chicken house and arranged into a square array, and the mounting height of the four mixed LED lamps is H and from about 1 meter (m) to about 3 m. The initial mounting distance between two adjacent LED lamps is ΔI and the maximum value of the initial mounting distance ΔI is H tan α, α is the viewing angle of a single mixed LED lamp. Therefore the minimum illuminance E of the four mixed LED lamps on the ground can be obtained according to the equation (1) below:

$$E = \pi \Phi H \left( H^2 + \frac{\Delta I^2}{2} \right)^{-\frac{3}{2}} \quad (1)$$

wherein, φ is the luminous flux of the mixed LED lamp.

2) Substitute the illuminance value required for the welfare rearing of broiler chickens which is equal to the minimum illuminance E obtained in the step above in the equation (2) to obtain the actual mounting distance L between two adjacent mixed LED lamps:

$$L = \left[ 2 \left( \frac{\Phi H^{\frac{2}{3}}}{\pi E} \right) - H^2 \right]^{\frac{1}{2}} \quad (2)$$

3) If L is less than or equal to H tan α, arrange the four mixed LED lamps into a L×L square array to create an evenly-distributed cyan light environment according to the actual mounting distance between two adjacent mixed LED lamps; if L is greater than H tan α, reduce the mounting height H by about 0.5 m, repeat the Step 1 to 2 above until the actual mounting distance obtained is less than or equal to H tan α, then arrange the four mixed LED lamps into a L×L square array to create an evenly-distributed cyan light environment.

The chicken house may be a closed type or semi-closed type. The illuminance of the mixed LED lamps is controlled by a LED controller 2 with the Pulse-Width Modulation (PWM) dimming mode.

2. An Eye-Friendly, Green-Blue Mixed LED Lighting System for Chicken Houses

The system comprises a power supply (1), a LED controller (2), mixed LED lamps (3), an illuminance sensor (4) and a chicken house (5); the mixed LED lamps (3) may be mounted in the chicken house (5), the LED controller (2) is connected with the illuminance sensor (4) and the mixed LED lamps (3), the power supply (1) is connected to the LED controller (2) for providing power, the illuminance sensor (4) for monitoring the light intensity of the chicken house is mounted on the ground of the chicken house (5), the mixed LED lamps (3) may be formed by combining green LED (6) and blue LED (7) on one lighting fixture according to the proportion ration of from about 1:5 to about 5:1, and the PWM dimming mode is adopted in the LED controller (2).

The green LED (6) and blue LED (7) in the mixed LED lamps (3) may be evenly and alternately arranged on the baseplate (8) into a circle, triangle, rectangle or straight line.

The mixed LED lamps (3) may be bulb, straight-tube or square.

The chicken house is a closed type or semi-closed type.

Four mixed LED lamps (3) may be mounted at the same height in the chicken house, arranged into a square array.

The side length L of the square array and the mounting height of the four mixed LED lamps (3) satisfy the equation (3), where φ is the luminous flux of the mixed LED lamps (3):

$$L = \left[ 2\left(\frac{\Phi H^{\frac{2}{3}}}{\pi E}\right) - H^2 \right]^{\frac{1}{2}} \quad (3)$$

where, L satisfies the equation that L≤H tan α, α is the viewing angle of a single mixed LED lamp (3) and the illuminance value E required for the welfare rearing of broiler chickens satisfies the equation (4):

$$E = \pi \Phi H \left( H^2 + \frac{\Delta l^2}{2} \right)^{-\frac{3}{2}} \quad (4)$$

wherein, ΔI is the initial mounting distance between two adjacent mixed LED lamps (3) and the maximum value of ΔI is H tan α.

Compared with the prior art, the present disclosure has the following beneficial effects.

Combination of green LED beads and blue LED beads on one lighting fixture not only reduces the cost of light sources, but also saves the labor required for replacing light sources compared with using green light sources and blue light sources at different rearing stages.

Combination of green LED beads and blue LED beads on one lighting fixture makes the best of the sensitivity reaction to green light and blue light, increases the individual weight, leg weight, feet weight, efficiency of feed utilization and growth rate, and reduces the weight of abdominal fat of broiler chickens.

The cyan emitted by the light source produced by combining green LED beads and blue LED beads on one lighting fixture which is softer to human eyes not only contains the spectrum of blue light and green light conducive to the growth of chickens, but also is helpful for protecting human eyes.

In the FIGs above, 1 represents a power supply, 2 represents a LED controller, 3 represents mixed LED lamps, 4 represents an illuminance sensor, 5 represents a chicken house, 7 represents a Blue LED, 8 represents a LED baseplate, and 9 represents a square array.

DETAILED DESCRIPTION OF THE PREFERRED EMBODIMENTS

The present disclosure is further detailed by the specific embodiments in combination with the drawings.

The present disclosure includes the following steps: in a chicken house, an evenly-distributed cyan light environment may be created for rearing broiler chickens, there may be mixed LED lamps in the cyan light environment, the mixed LED lamp may be formed by combining green LED beads and blue LED on one lighting fixture with a mixing proportion of from about 1:5 to about 5:1. In the first three days of the breeding period, the mixed LED lamps may be used for 24-hour lighting and the illuminance may be the illuminance value required for the welfare rearing of broiler chickens. From the fourth day of the breeding period, the daily lighting duration of the mixed LED lamps may be progressively decreased by 1 h every day from 23 h to 16 h and the illuminance may be half the illuminance value required for the welfare rearing of broiler chickens until the end of the rearing.

The illuminance value required for the welfare rearing of broiler chickens is $$\pi\Phi H\left(H^2 + \frac{\Delta l^2}{2}\right)^{-\frac{3}{2}},$$

wherein φ is the luminous flux of the mixed LED lamps, H is the mounting height of the mixed LED lamps and ΔI is the initial mounting distance between two adjacent mixed LED lamps.

Figure 9:
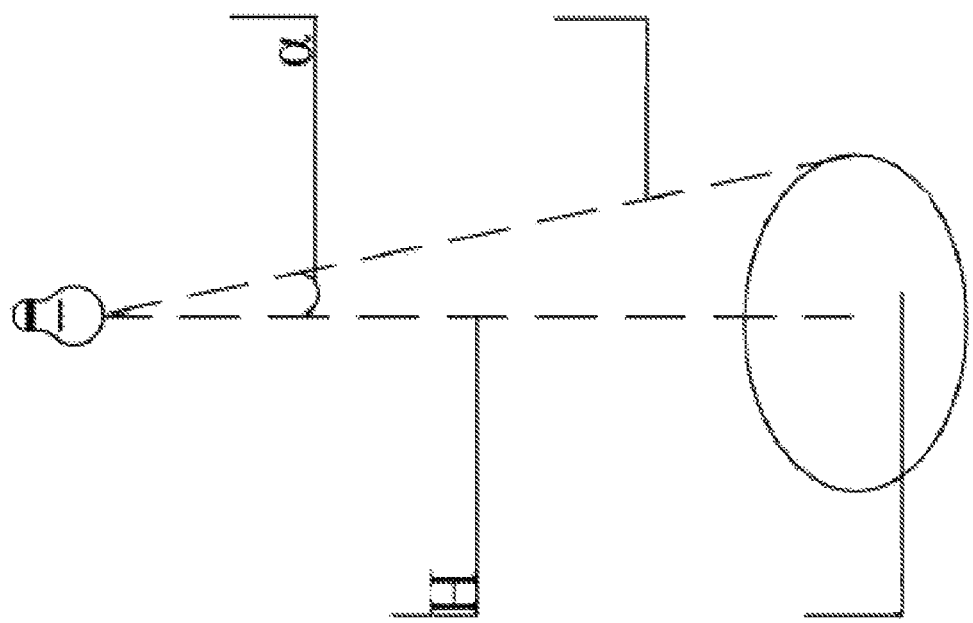
FIG. 9 illustrates a model of an illuminance of a single light source.
Figure 10:
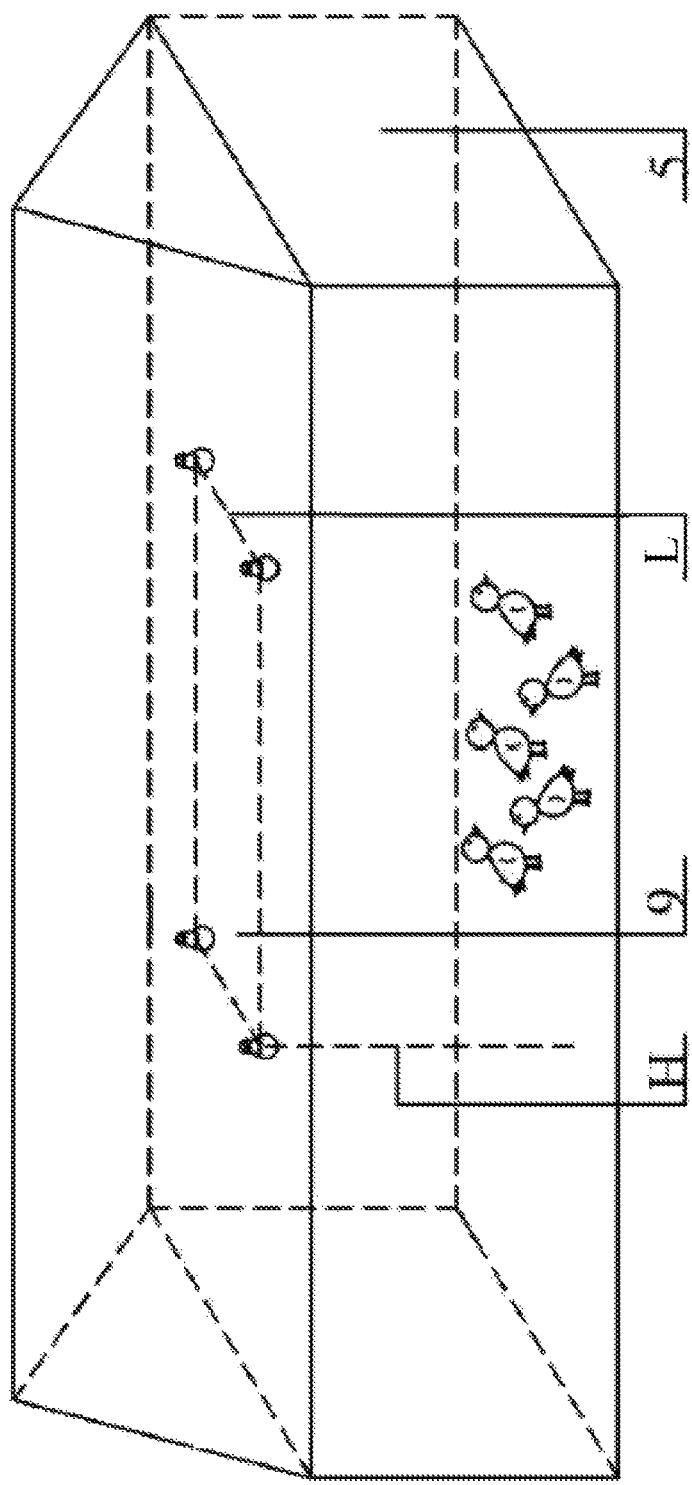
FIG. 10 illustrates a square array formed by four mixed LED lamps.

As shown in FIGS. 9 to 10, the mixed LED lamps in the cyan light environment may be arranged as below.

Four mixed LED lamps may be mounted in a chicken house and arranged into a square array, the mounting height of the four mixed LED lamps is H and from 1 m to 3 m, the initial mounting distance between two adjacent LED lamps is ΔI and the maximum value of the initial mounting distance ΔI is H tan α, α is the viewing angle of a single mixed LED lamp, therefore the minimum illuminance E of the four mixed LED lamps on the ground can be obtained according to the equation (1) below:

$$E = \pi\Phi H\left(H^2 + \frac{\Delta l^2}{2}\right)^{-\frac{3}{2}} \quad (1)$$

wherein, φ is the luminous flux of the mixed LED lamp;

Substitute the illuminance value required for the welfare rearing of broiler chickens which may be equal to the minimum illuminance E obtained in the step above into the equation (2) to obtain the actual mounting distance L between two adjacent mixed LED lamps:

$$L = \left[2\left(\frac{\Phi H^{\frac{2}{3}}}{\pi E}\right) - H^2\right]^{\frac{1}{2}} \quad (2)$$

If L is less than or equal to H tan α, arrange the four mixed LED lamps into a L×L square array to create an evenly-distributed cyan light environment according to the actual mounting distance between two adjacent mixed LED lamps; if L is greater than H tan α, reduce the mounting height H by 0.5 m, repeat the Step 1 to 2 above until the actual mounting distance obtained is less than or equal to H tan α, then arrange the four mixed LED lamps into a L×L square array to create an evenly-distributed cyan light environment.

The chicken house may be a closed type or semi-closed type.

The illuminance of the mixed LED lamps 3 is controlled by a LED controller 2 with A PWM dimming mode.

Figure 2:
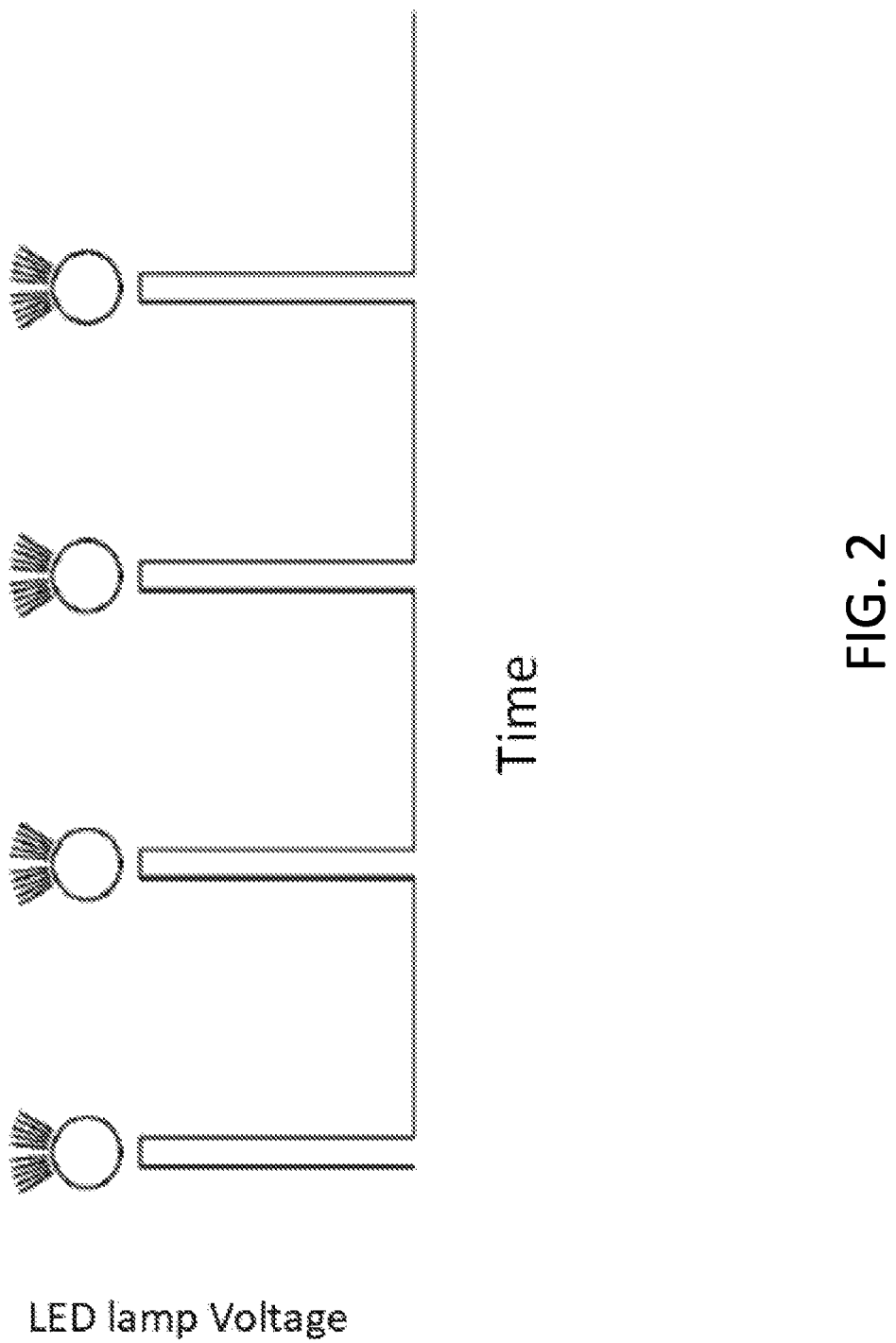
FIG. 2 illustrates a principle of a PWM dimming mode with a duty ratio of 10%.
Figure 3:
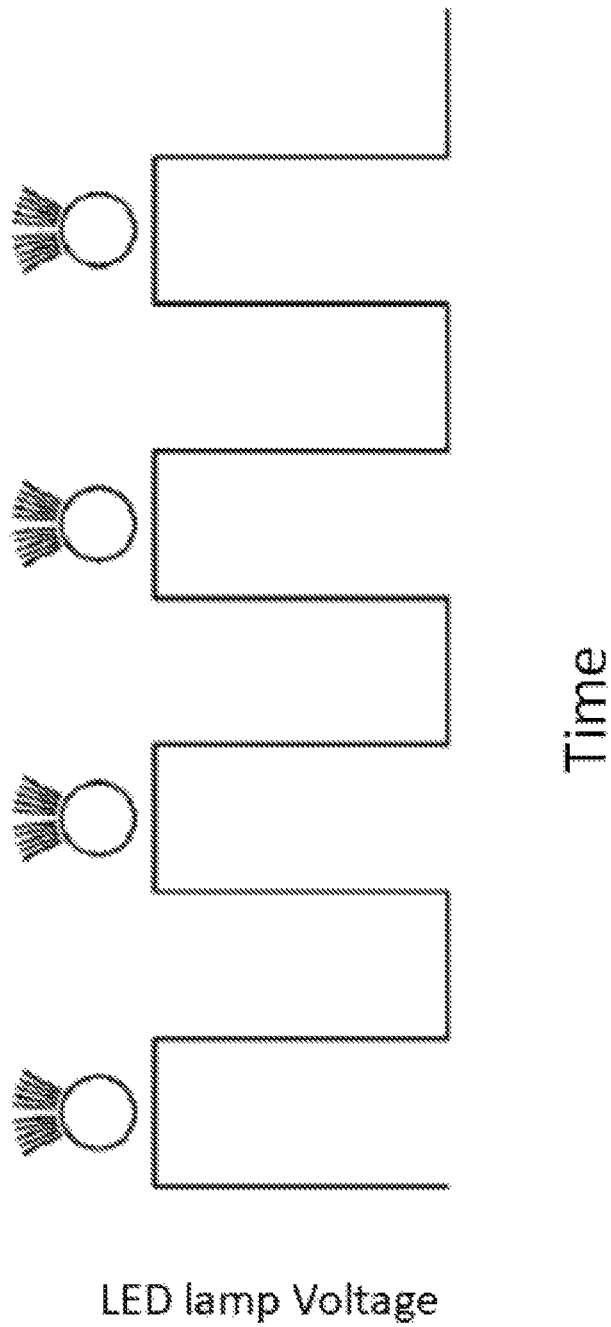
FIG. 3 illustrates a principle of a PWM dimming mode with the duty ratio of 50%.
Figure 4:
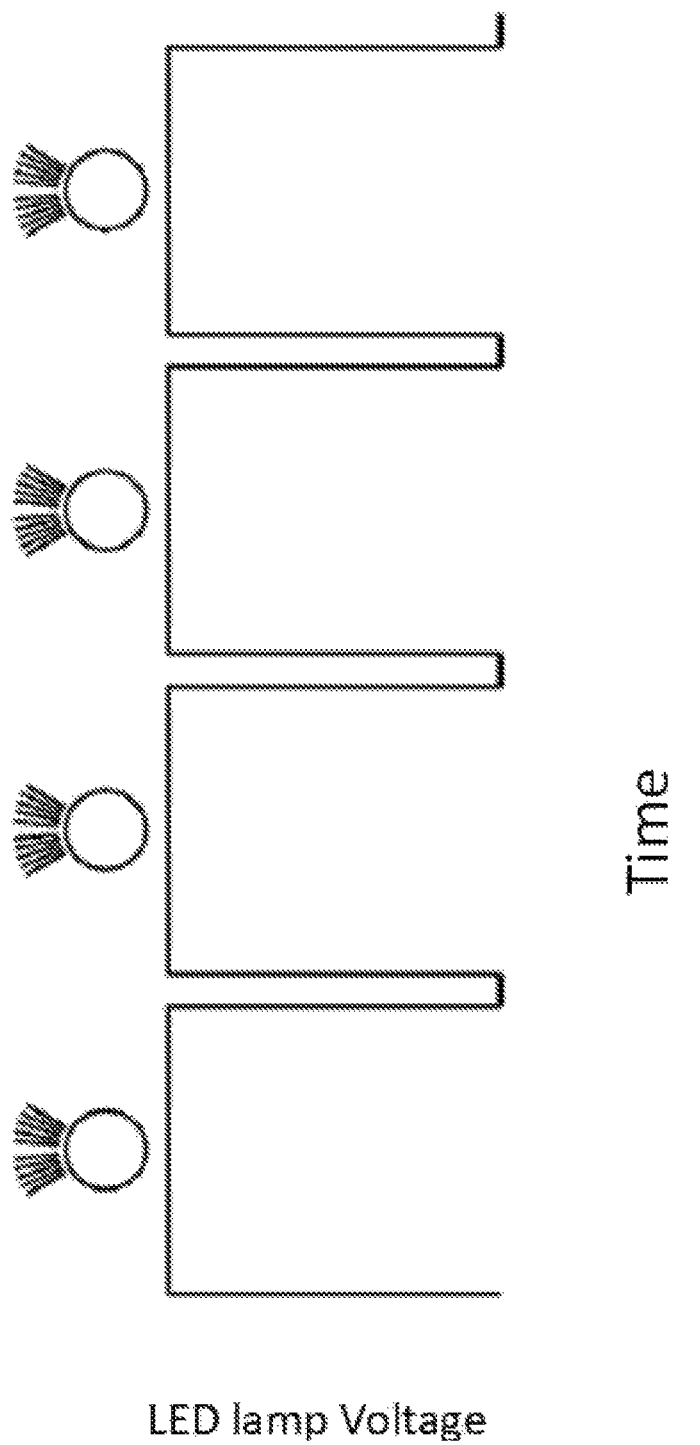
FIG. 4 illustrates the principle of the PWM dimming mode with a duty ratio of 90%.
Figure 5:
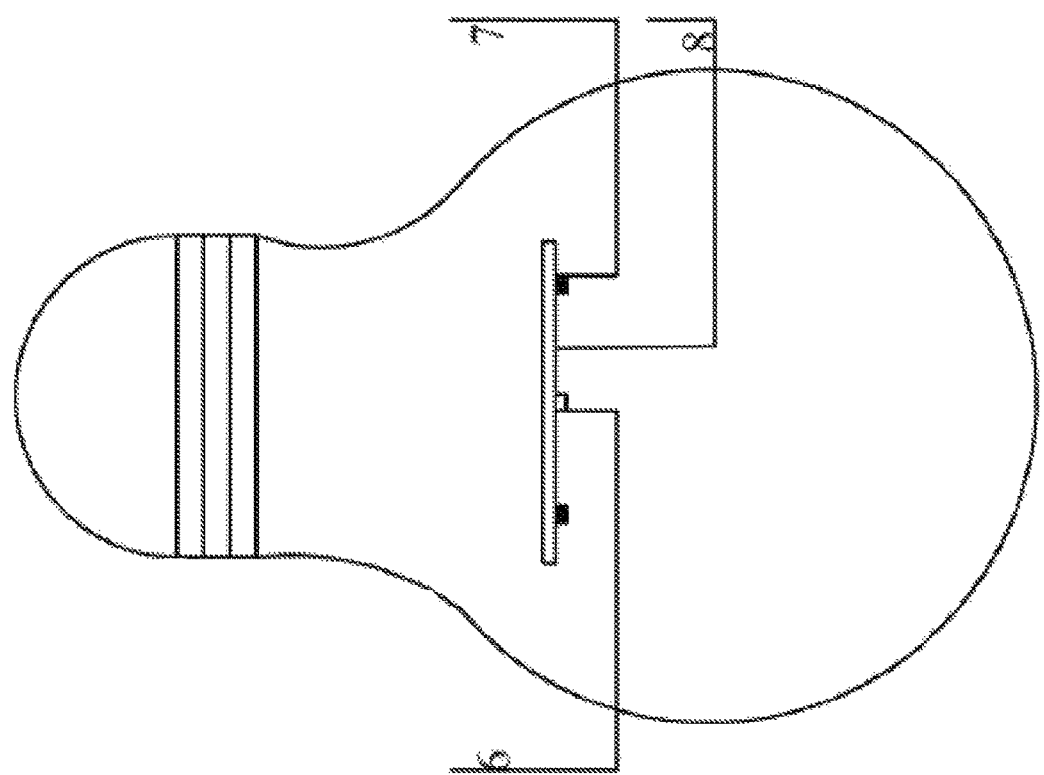
FIG. 5 illustrates a mixed LED bulb.
Figure 6:
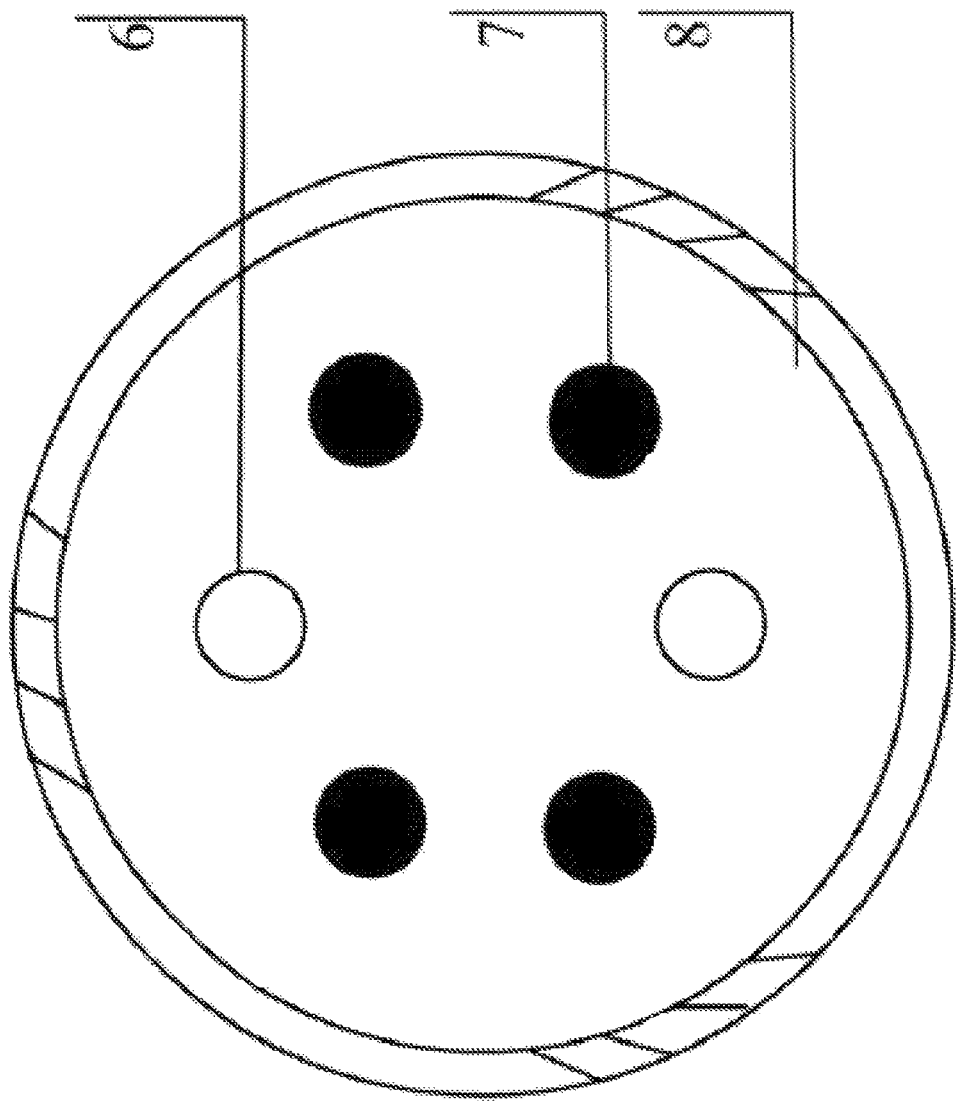
FIG. 6 illustrates an alternate arrangement of green LED and blue LED in a mixed LED bulb lamp in a circle (a mixing proportion of 2:4)
Figure 7:
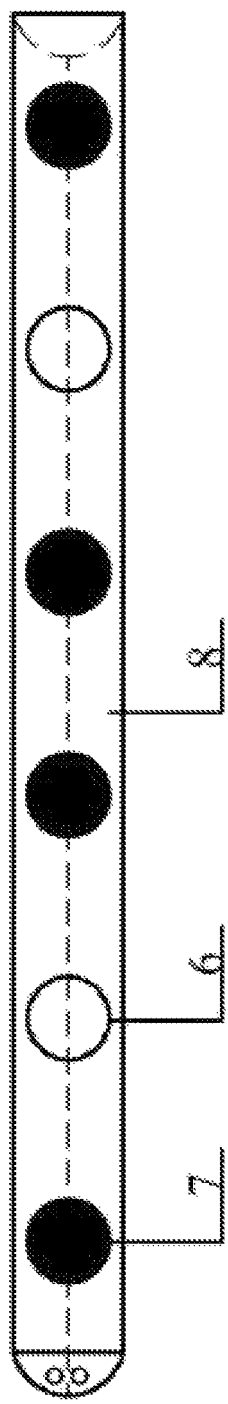
FIG. 7 illustrates the alternate arrangement of green LED beads and blue LED beads in a mixed LED straight-tube lamp in a straight line (mixing proportion of 2:4)
Figure 8:
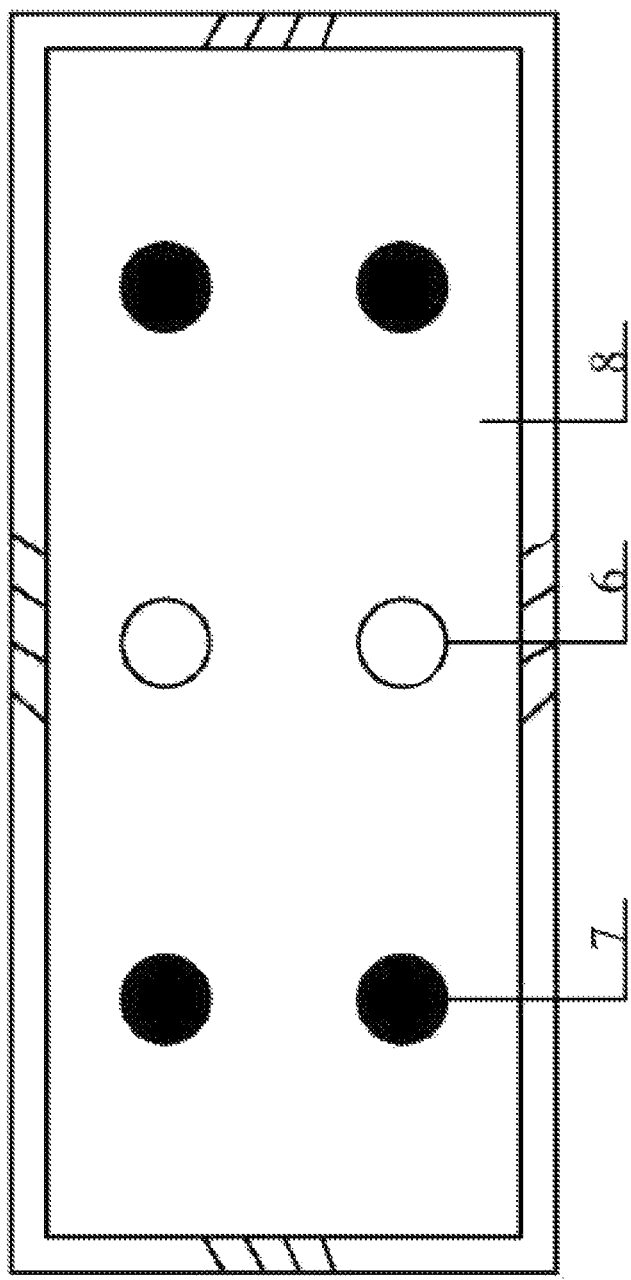
FIG. 8 illustrates the alternate arrangement of green LED beads and blue LED in a mixed LED square lamp in a rectangle (mixing proportion of 2:4)

PWM dimming, also known as digital dimming, is to change the mean value of light output by operating the switching circuit at a frequency sufficient high for the recognition of human eyes. Generally, the operating frequency can reach over 1 K-10 KHZ, and the adjustment of the average light intensity may be accomplished by adjusting the duty ratio of PWM. A PMW control circuit may be constructed by means of an 80C51 microcontroller and a MOS amplifying tube, and the duty ratio may be adjusted through the counting of the timer of the 80C51 microcontroller TM0 so as to adjust the brightness. FIGS. 2 to 4 illustrate the principle of operation when the time ratio of high level in a pulse period may be 10%, 50% and 90% respectively.

According to the present disclosure, a lamp emitting green light and blue light may be provided during the rearing of broiler chickens, which not only promotes the growth of broiler chickens and increases the efficiency of feed utilization, but also may be helpful for protecting human eyes: the disadvantages of replacing light sources for the reason that green light sources and blue light source are required at different rearing stages and high cost of light sources are overcome by introducing the cyan light environment; besides, green light emitted by the green LED beads in the mixed LED lamps promotes the growth of broiler chickens at earlier stage while blue light emitted by the blue LED promotes the growth of broiler chickens at later stage; for the workers in the chicken house, the cyan light environment produced by the mixed LED lamps reduces bad irritation of green light and blue light to human eyes and makes the workers feel more comfortable.

The cyan light emitted by the mixed LED lamps mixed at various proportions may be evenly distributed in the chicken house, which makes the best of the sensitivity reaction of broiler chickens to green light and blue light, increasing the individual weight and reducing the cost of light sources and maintenance thereof, and may be helpful for protecting human eyes.

Figure 1:
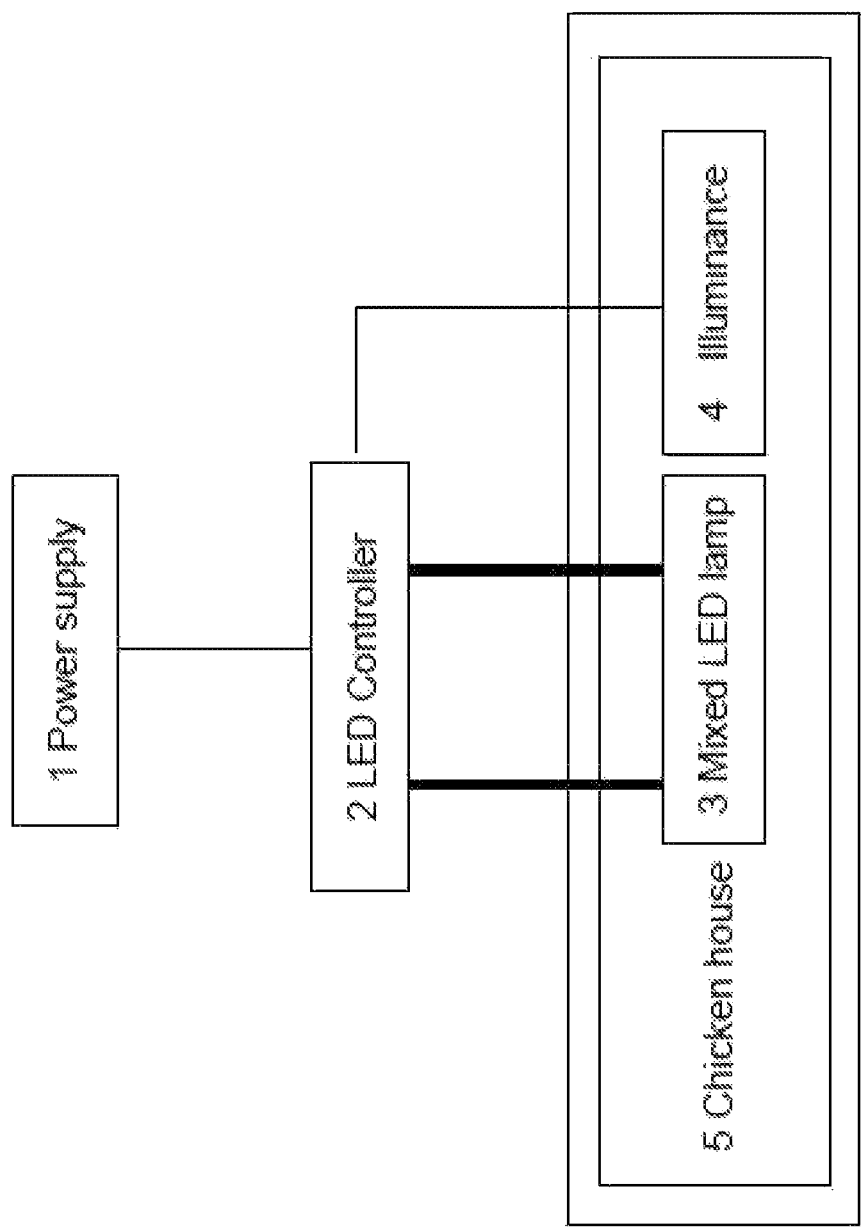
FIG. 1 illustrates a principle of systems according to the present disclosure.

As shown in FIG. 1, the system according to the present disclosure comprises a power supply 1, a LED controller 2, mixed LED lamps 3, an illuminance sensor 4 and a chicken house 5; the mixed LED lamps 3 may be mounted in the chicken house 5, the LED controller 2 may be connected with the illuminance sensor 4 and the mixed LED lamps 3, the power supply 1 may be connected to the LED controller 2 for providing power, the illuminance sensor 4 for monitoring the light intensity of the chicken house may be mounted on the ground of the chicken house 5, the mixed LED lamps 3 may be formed by combining green LED 6 and blue LED 7 on one lighting fixture according to the proportion ration of from about 1:5 to about 5:1 (1:5~5:1), and the PWM dimming mode may be adopted in the LED controller 2.

As shown in FIG. 10, four mixed LED lamps 3 may be mounted at the same height in the chicken house, arranged into a square array.

As shown FIGS. 9 to 10, the side length L of the square array and the mounting height of the mixed LED lamps 3 satisfy the equation (3), and φ is the luminous flux of the mixed LED lamps 3:

$$L = \left[2\left(\frac{\Phi H^{\frac{2}{3}}}{\pi E}\right) - H^2\right]^{\frac{1}{2}} \quad (3)$$

where, L satisfies the equation that L≤H tan α, α is the viewing angle of a single mixed LED lamp 3 and the illuminance value E required for the welfare rearing of broiler chickens satisfies the equation (4):

$$E = \pi\Phi H\left(H^2 + \frac{\Delta l^2}{2}\right)^{-\frac{3}{2}} \quad (4)$$

where, ΔI is the initial mounting distance between two adjacent mixed LED lamps and the maximum value of ΔI is H tan α.

The green LED 6 and blue LED 7 in the mixed LED lamps may be evenly and alternately arranged into a circle, triangle, rectangle or straight line on the baseplate 8.

The mixed LED lamps 3 may be bulb, straight-tube or square.

The chicken house may be a closed type or semi-closed type.

The power supply 1 may be connected to the LED controller 3 by means of wires 2, and the LED controller 3 may be connected with the mixed LED lamps 5 by means of the control circuit 4 to set the target light intensity of the mixed LED lamps 5. The mixed LED lamps may be connected directly to the AC power supply via the inbuilt power supply or connected with the LED controller which may be connected to the AC power supply to obtain power. The illuminance sensor 6 monitors the light intensity in the chicken house in real time so as to maintain the light intensity in the chicken house within the target range.

PWM dimming, also known as digital dimming, may be to change the mean value of light output by operating the switching circuit at a frequency sufficient high for the recognition of human eyes. Generally, the operating frequency can reach over 1K-10 KHZ, and the adjustment of the average light intensity may be accomplished by adjusting the duty ratio of PWM. A PWM control circuit may be constructed by means of an 80C51 microcontroller and a MOS amplifying tube, and the duty ratio may be adjusted through the counting of the timer of the 80C51 microcontroller TM0 so as to adjust the brightness. FIGS. 2 to 4 illustrate the principle of operation when the time ratio of high level in a pulse period may be 10%, 50% and 90% respectively.

As shown in FIGS. 5 to 8, the mixed LED lamps may be bulb, straight tube or square, the green LED lamps and the blue LED in the mixed bulb LED lamps may be alternately arranged into a circle, triangle or square on the baseplate; the green LED lamps and the blue LED in the mixed straight-tube LED lamps may be alternately arranged into a straight line on the baseplate; the green LED lamps and the blue LED in the mixed square LED lamps may be alternately arranged into a circle, triangle or square on the baseplate.

The embodiments of the present disclosure are as below:

Embodiment 1

In a chicken house, an evenly-distributed cyan light environment may be created for rearing broiler chickens, there may be mixed LED lamps in the cyan light environment, the mixed LED lamp may be formed by combining green LED lamps and blue LED on one lighting fixture, and the mixed LED lamps in the cyan light environment may be arranged as below:

Four mixed LED lamps with the luminous flux of φ=1418 Lm may be mounted in a 105.0 m² (15.0 m×7.0 m) chicken house for breeding and arranged in a square array, the mounting height of the four mixed LED lamps is H=1.8 m, the initial mounting distance between two adjacent LED lamps is ΔI=2.0 m and the maximum value is H tan α=3.8 m when the distance between two adjacent LED lamps ΔI=2.0 m, α, the viewing angle of a single mixed LED lamp, is equal to 65°, therefore the minimum illuminance E of the four mixed LED lamps on the ground is calculated to be 30 Lx according to the equation (1);

Substitute the illuminance value (30 Lx) required for the welfare rearing of broiler chickens in the chicken house for breeding which is equal to the minimum illuminance E obtained in the step above into the equation (2) to obtain the actual mounting distance L of 3.4 m between two adjacent mixed LED lamps;

If L (=3.4 m) is less than H tan α (=3.8 m), arrange the four mixed LED lamps into a 3.4 m×3.4 m square array to create an evenly-distributed cyan light environment according to the actual mounting distance L (=3.4 m) between two adjacent mixed LED lamps.

Carry out the green-blue mixed LED rearing test with the proportion of 1:5~5:1 by applying the well-distributed cyan light environment created as described above into the practical production of broiler chickens.

Seven experimental groups including G0B6, G1B5, G2B4, G3B3, G4B2, G5B1 and G6B0 may be set in the experiment. The ratios of green light LED to blue light LED in Group G0B6, G1B5, G2B4, G3B3, G4B2, G5B1 and G6B0 may be 0:6, 1:5, 2:4, 3:3, 4:2, 5:1 and 6:0 respectively.

As shown in Table 1, 210 1-day-old "plum blossom-yellow" hens may be divided at random into seven experimental groups, i.e. G0B6, G1B5, G2B4, G3B3, G4B2, G5B1 and G6B0 (30 hens in each group) for 45-day breeding. During the breeding period, totally-closed rearing may be adopted, i.e. the chickens may be exposed only to the light of the mixed LED lamps. To stimulate 1~3-day-old chicks in the breeding period to learn drinking and eating, the lighting duration may be set to be 24 h and the light intensity may be controlled at 30 Lux; for over 3-day-old chickens, the lighting duration may be progressively decreased by 1 h every day and finally kept at a photoperiod of 18L:6D till the end of the 45-day breeding period. In order to control the light intensity at the half of the illuminance value required for the welfare rearing of broiler chickens for over 3-day-old chickens, i.e. 15 Lux, the mixed LED lamps may be also arranged according to the method above: 1) four mixed LED lamps with the luminous flux of φ=118 Lm may be mounted in the same chicken house for breeding (15.0 m×7.0 m) and arranged in a square array, the mounting height of the four mixed LED lamps may be H=1.0 m, the initial mounting distance between two adjacent LED lamps is ΔI=1.5 m and the maximum value is H tan α=2.1 m when the distance between two adjacent LED lamps is ΔI=1.5 m, α, the viewing angle of a single mixed LED lamp, is equal to 65°, therefore the minimum illuminance E of the four mixed LED lamps on the ground is calculated to be 15 Lx according to the equation (1); substitute the illuminance value (15 Lx) required for the welfare rearing of broiler chickens in the chicken house for breeding which is equal to the minimum illuminance E obtained in the step above into the equation (2) to obtain the actual mounting distance L of 1.3 m between two adjacent mixed LED lamps; for L satisfies the equation of L≤H tan α=2.1 m, arrange the four mixed LED lamps into a 1.3 m×1.3 m square array.

TABLE 1

Seven Experimental Groups

| Proportion of green to blue | Color | Light intensity | Light regime |
|---|---|---|---|
| 0:6 | Blue | 30 Lux when 1 to 3 days old | 24L:0D when 1 to 3 days old |
| 1:5 | Cyan | | |
| 2:4 | Cyan | 15 Lux when 4 to 45 days old | 16L:8D when 4 to 45 days old |
| 3:3 | Cyan | | |
| 4:2 | Cyan | | |

TABLE 1-continued

Seven Experimental Groups

| Proportion of green to blue | Color | Light intensity | Light regime |
|---|---|---|---|
| 5:1 | Cyan | | |
| 6:0 | Green | | |

Weigh the chickens in each experimental group every day to investigate the effects of the green-blue mixed LED lamps with the proportion of 1:5~5:1 on the individual weight of the broiler chickens in the breeding period. Make an analysis of variance for the data by using IBM SPSS Statistics 20 Software Suite. The significance level p=0.05 and the lowercase letters indicate that there may be significant difference in level.

Figure 11:
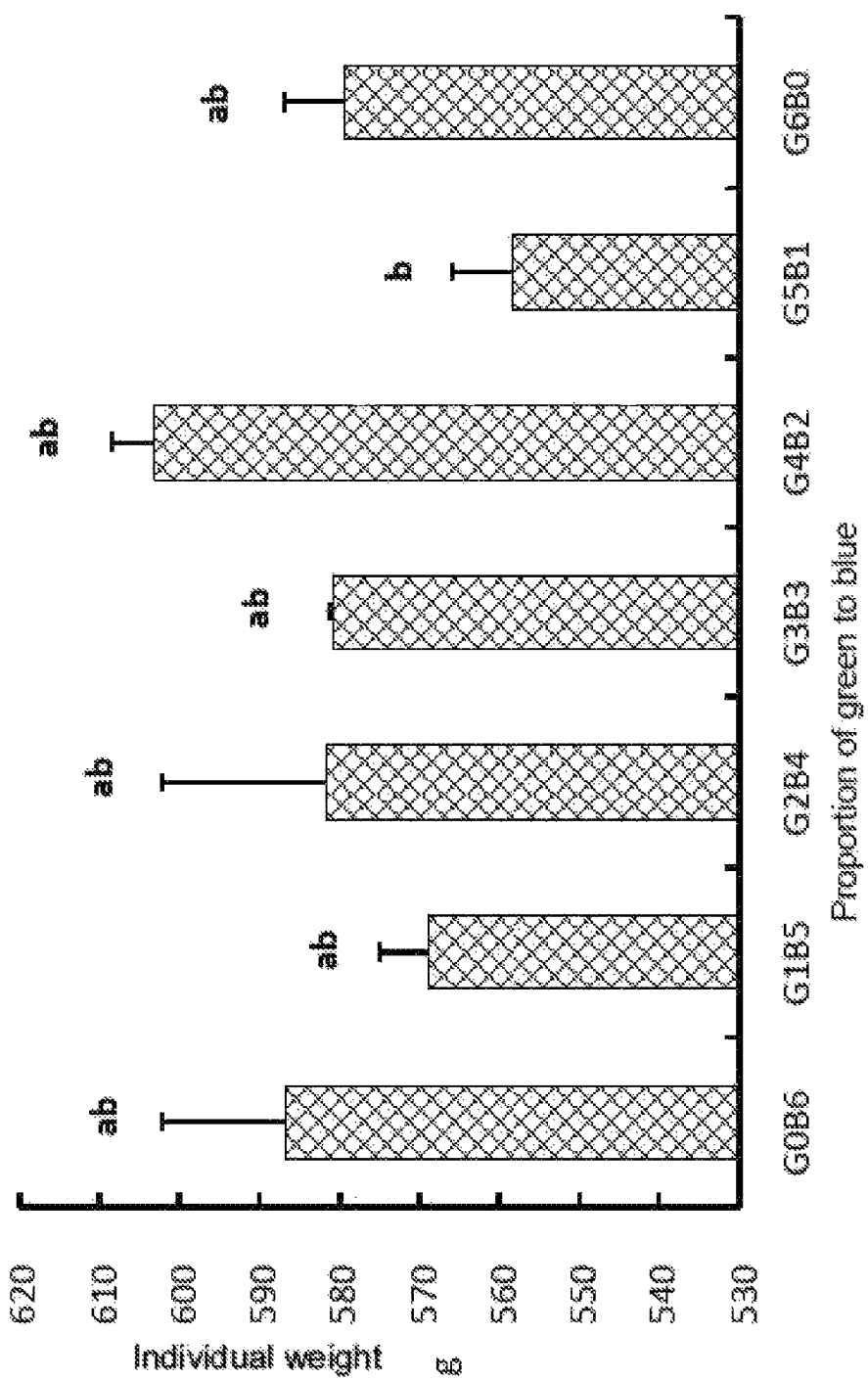
FIG. 11 is a diagram illustrating effects of mixed LED lamps with a mixing proportion of from about 5:1 to about 1:5 on the individual weight of 45-day-old broiler chickens.

FIG. 11 illustrates the effects of the mixed LED lamps with the mixing proportion of from about 5:1 to about 1:5 on the individual weight of 45-day-old broiler chickens, i.e. the effect diagram of the present disclosure; The data show that Group G4B2, i.e. the mixed LED lamps of which the proportion of the green LED lamps and the blue LED is 4:2 can increase the individual weight of the broiler chickens in the breeding period. The test shows that the mixed LED lamps with the proportion of 4:2 which can make the best of sensitivity reaction to green light and blue light promote the growth of broiler chickens and raise the production benefits. Besides, combination of green LED beads and blue LED beads on one lighting fixture by the proportion of 4:2 not only reduces the cost of light sources, but also saves the labor required for replacing light sources compared with using green light sources and blue light sources at different rearing stages. The cyan emitted by the light source produced by combining green LED beads and blue LED beads on one lighting fixture which is softer to human eyes not only contains the spectrum of blue light and green light conducive to the growth of chickens, but also is helpful for protecting human eyes.

Embodiment 2

In a chicken house, an evenly-distributed cyan light environment may be created for rearing broiler chickens, there may be mixed LED lamps in the cyan light environment, the mixed LED lamp may be formed by combining green LED and blue LED on one lighting fixture, and the mixed LED lamps in the cyan light environment may be arranged as below:

Four mixed LED lamps with the luminous flux of $\phi=236$ Lm may be mounted in a 105.0 m² (15.0 m×7.0 m) chicken house for breeding and arranged into a square array, the mounting height of the four mixed LED lamps is H=3.0 m, the initial mounting distance between two adjacent LED lamps is $\Delta I=4.0$ m and the maximum value is H tan $\alpha=6.4$ m when the distance between two adjacent LED lamps is $\Delta I=4.0$ m, a, the viewing angle of a single mixed LED lamp, is equal to 65°, therefore the minimum illuminance E of the four mixed LED lamps on the ground is calculated to be 30 Lx according to the equation (1);

Substitute the illuminance value (30 Lx) required for the welfare rearing of broiler chickens in the chicken house for breeding which is equal to the minimum illuminance E obtained in the step above into the equation (2) to obtain the actual mounting distance L of 5.5 m between two adjacent mixed LED lamps;

If L (=5.5 m) is less than H tan $\alpha$ (=6.4 m), arrange the four mixed LED lamps into a 5.5 m×5.5 m square array to create an evenly-distributed cyan light environment according to the actual mounting distance L (=5.5 m) between two adjacent mixed LED lamps.

Carry out the green-blue mixed LED rearing test with the proportion of 1:5~5:1 by applying the well-distributed cyan light environment created as described above into the practical production of broiler chickens.

Seven experimental groups including G0B6, G1B5, G2B4, G3B3, G4B2, G5B1 and G6B0 may be set in the experiment. The ratios of green light LED to blue light LED in Group G0B6, G1B5, G2B4, G3B3, G4B2, G5B1 and G6B0 may be 0:6, 1:5, 2:4, 3:3, 4:2, 5:1 and 6:0 respectively.

As shown in Table 2, 210 1-day-old "plum blossom-yellow" hens may be divided at random into seven experimental groups, i.e. G0B6, G1B5, G2B4, G3B3, G4B2, G5B1 and G6B0 (30 hens in each group) for 45-day breeding. Du ring the breeding period, totally-closed rearing may be adopted, i.e. the chickens may be exposed only to the light of the mixed LED lamps. To stimulate 1~3-day-old chicks in the breeding period to learn drinking and eating, the lighting duration may be set to be 24 h and the light intensity may be controlled at 30 Lux; for over 3-day-old chickens, the lighting duration may be progressively decreased by 1 h every day and finally kept at a photoperiod of 18L:6D till the end of the 45-day breeding period. In order to control the light intensity at the half of the illuminance value required for the welfare rearing of broiler chickens for over 3-day-old chickens, i.e. 15 Lux, the mixed LED lamps may be also arranged according to the method above: 1) four mixed LED lamps with the luminous flux of $\phi=118$ Lm may be mounted in the same chicken house for breeding (15.0 m×7.0 m) and arranged in a square array, the mounting height of the four mixed LED lamps may be H=1.0 m, the initial mounting distance between two adjacent LED lamps is $\Delta I=1.5$ m and the maximum value is H tan $\alpha=2.1$ m when the distance between two adjacent LED lamps is $\Delta I=1.5$ m, $\alpha$, the viewing angle of a single mixed LED lamp, is equal to 65°, therefore the minimum illuminance E of the four mixed LED lamps on the ground is calculated to be 15 Lx according to the equation (1); substitute the illuminance value (15 Lx) required for the welfare rearing of broiler chickens in the chicken house for breeding which is equal to the minimum illuminance E obtained in the step above into the equation (2) to obtain the actual mounting distance L of 3.4 m between two adjacent mixed LED lamps; since L satisfies the equation of L≤H tan $\alpha=2.1$ m, arrange the four mixed LED lamps into a 1.3 m×1.3 m square array.

TABLE 2

Seven Experimental Groups

| Proportion of green to blue | Color | Light intensity | Light regime |
|---|---|---|---|
| 0:6 | Blue | 30 Lux when 1 to 3 days old | 24L:0D when 1 to 3 days old |
| 1:5 | Cyan | | |
| 2:4 | Cyan | 15 Lux when 4 to 45 days old | 16L:8D when 4 to 45 days old |
| 3:3 | Cyan | | |
| 4:2 | Cyan | | |
| 5:1 | Cyan | | |
| 6:0 | Green | | |

Record the feed consumption of each experimental group every day, weigh the chickens in each experimental group every day and calculate the efficiency of feed utilization (the ratio of feed to chicken) to investigate the effects of the green-blue mixed LED lamps with the proportion of 1:5~5:1 on the efficiency of feed utilization of the broiler chickens in the breeding period. Make an analysis of variance for the data by using IBM SPSS Statistics 20 Software Suite. The significance level p=0.05 and the lowercase letters indicate that there may be significant difference in level.

Figure 12:
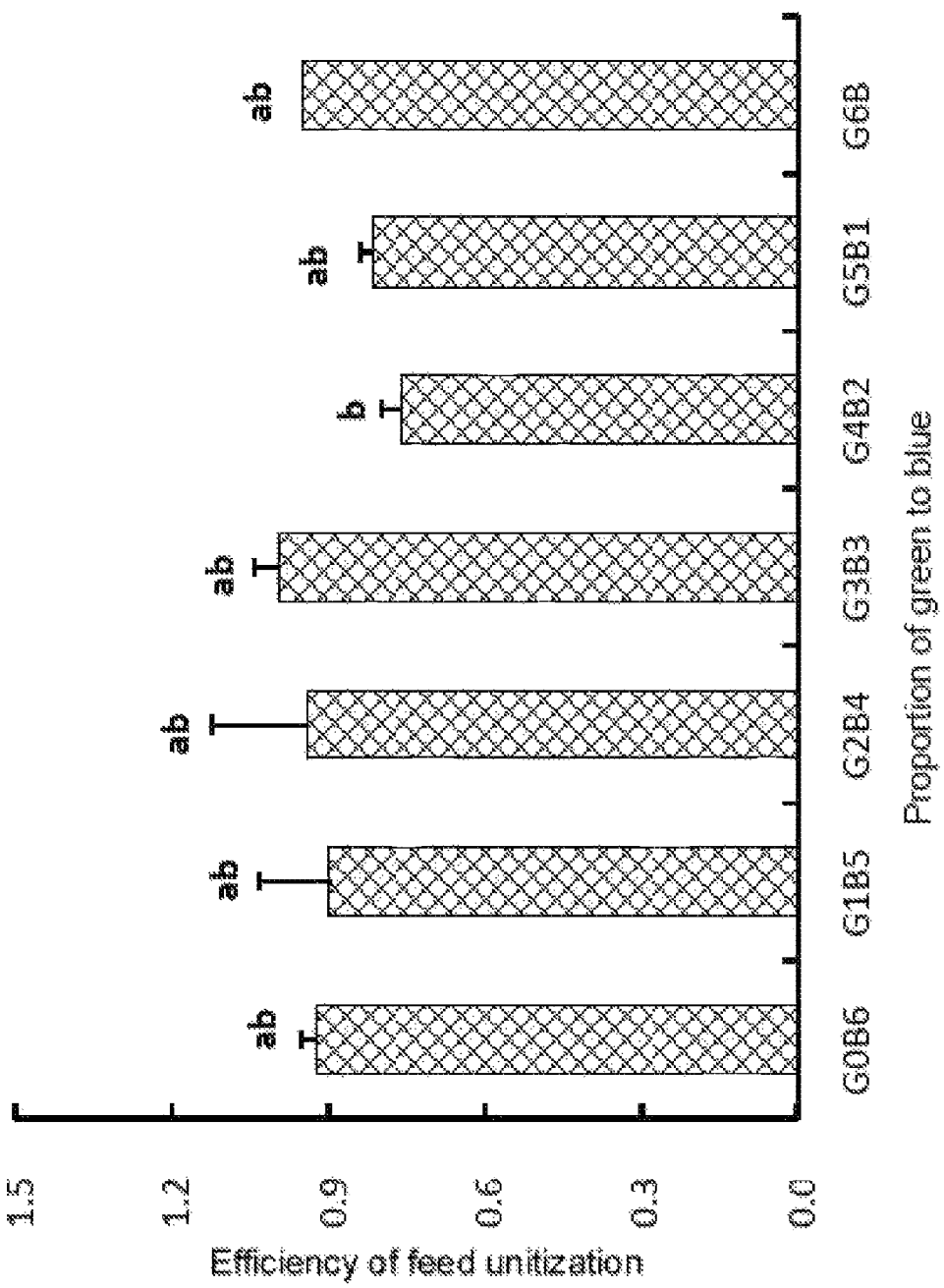
FIG. 12 is a diagram illustrating effects of mixed LED lamps with a mixing proportion of from about 5:1 to about 1:5 on efficiency of feed utilization of 45-day-old chickens.
Figure 13:
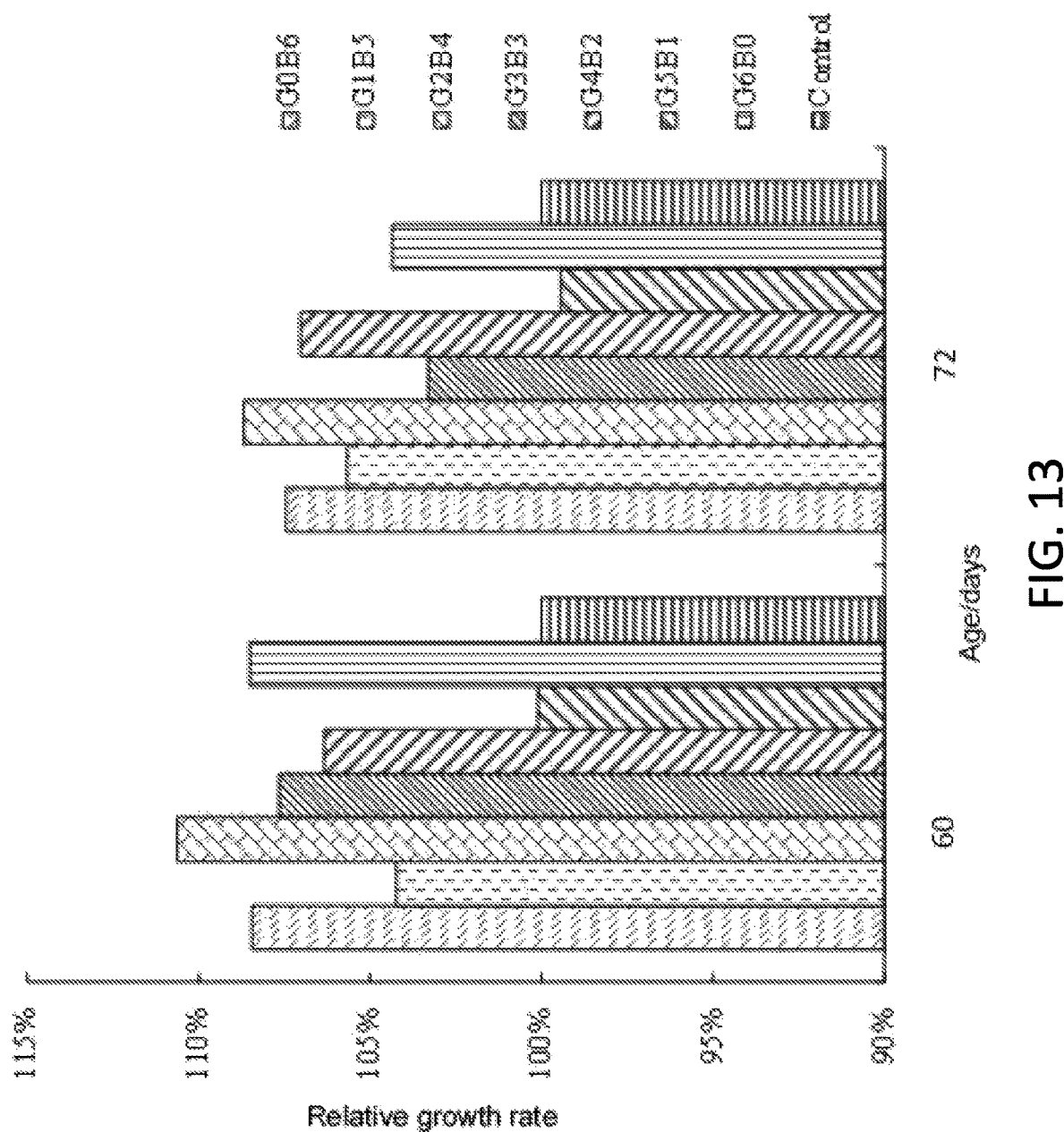
FIG. 13 is a diagram illustrating effects of mixed LED lamps with a mixing proportion of from about 5:1 to about 1:5 on a growth rate of 60-day-old and 72-day-old broiler chickens.
Figure 14:
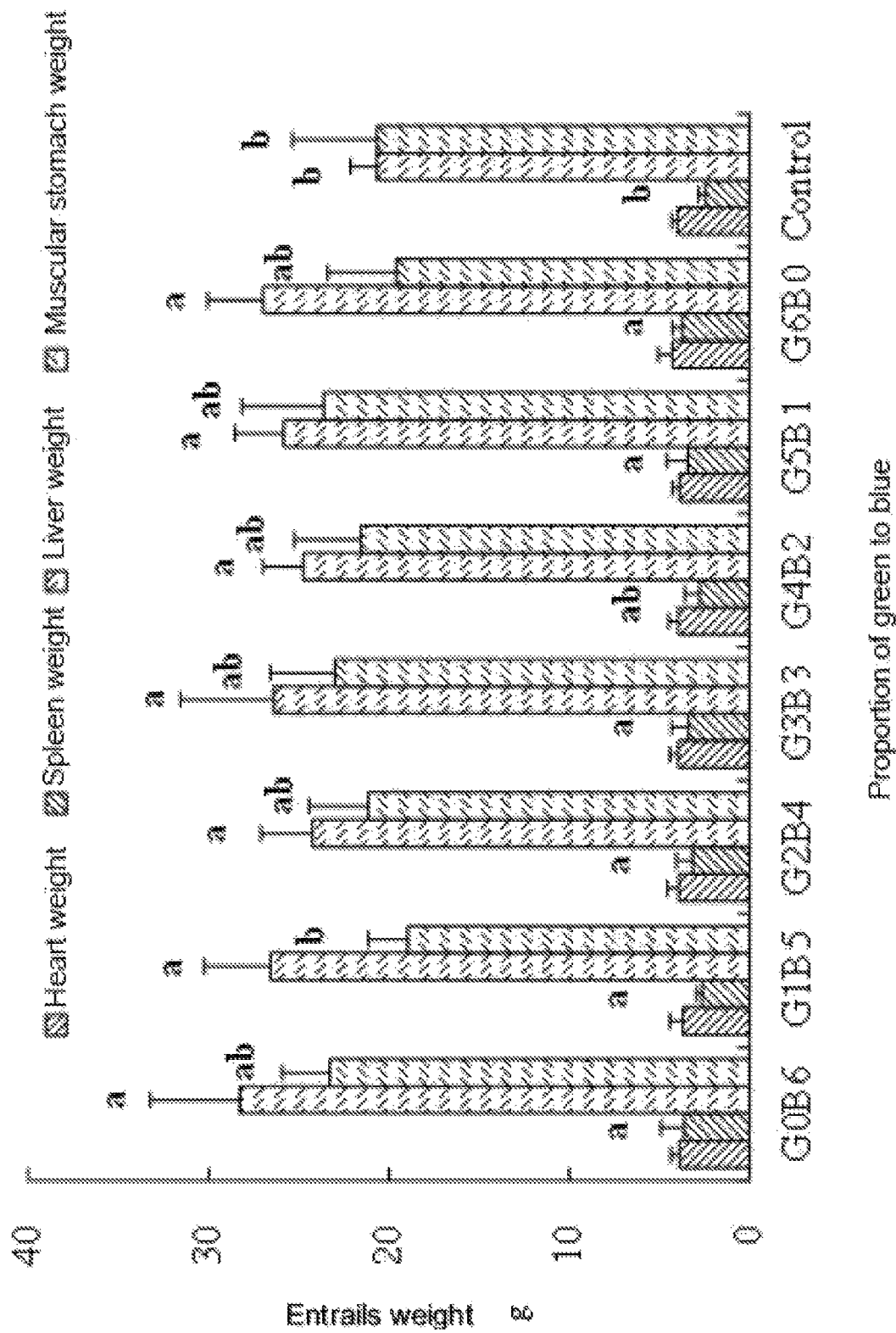
FIG. 14 is a diagram illustrating effects of mixed LED lamps with a mixing proportion of 5:1~1:5 on the entrails weight of chickens for sale (81 days old)
Figure 15:
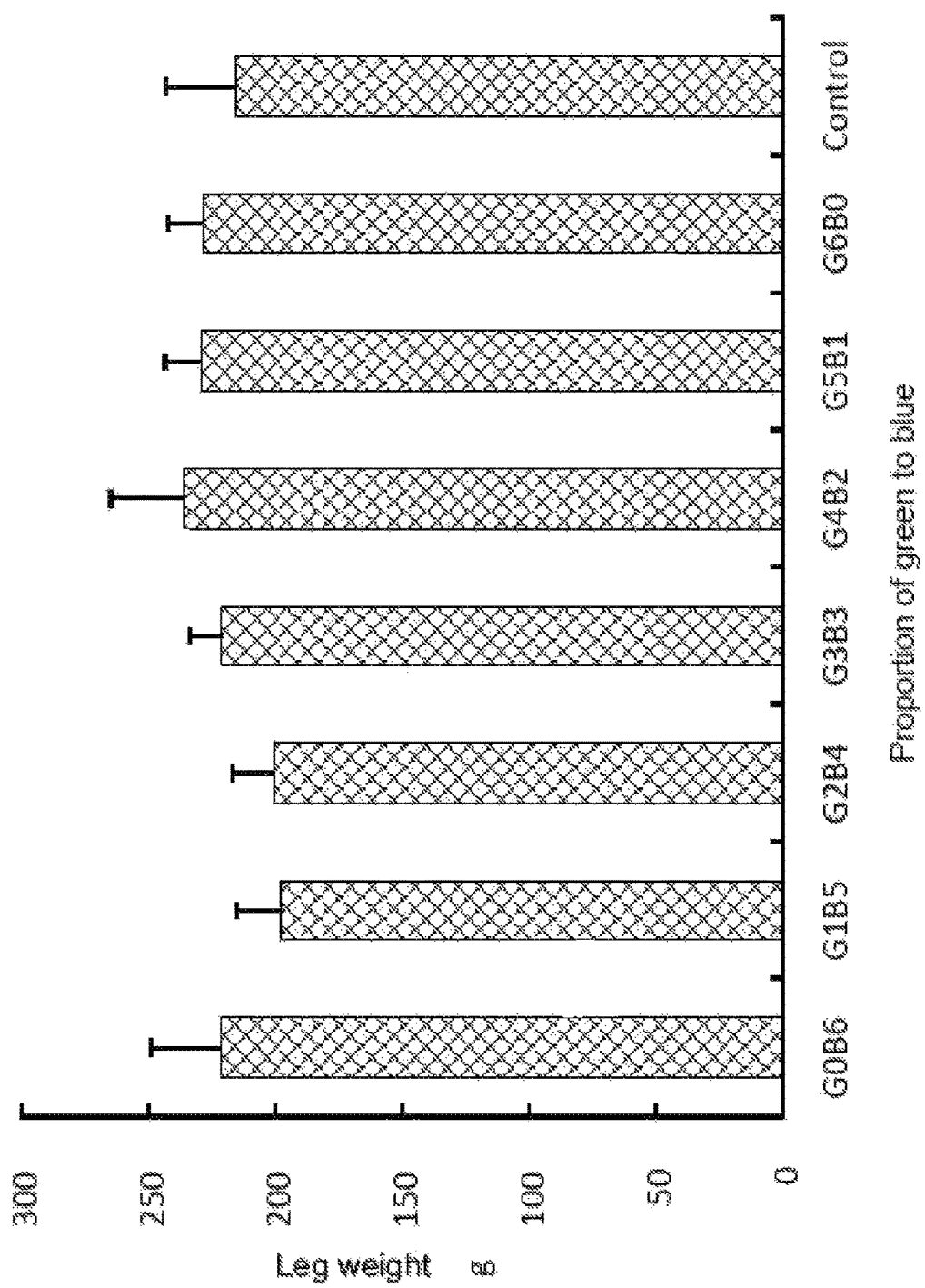
FIG. 15 is a diagram illustrating effects of mixed LED lamps with a mixing proportion of from about 5:1 to about 1:5 on a leg weight of chickens for sale (81 days old)
Figure 16:
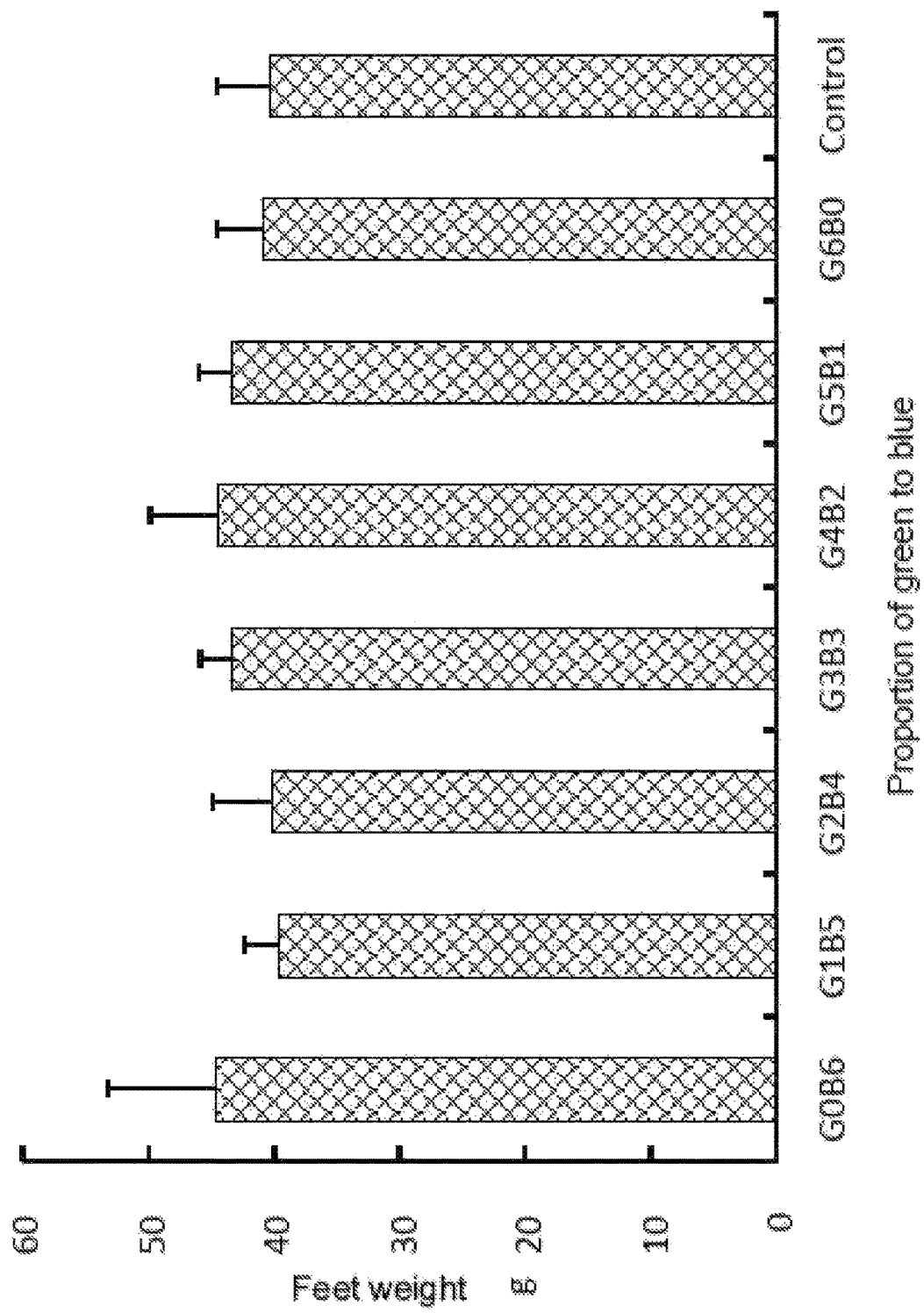
FIG. 16 is a diagram illustrating effects of mixed LED lamps with a mixing proportion of from about 5:1 to about 1:5 on a feet weight of chickens for sale (81 days old)

FIG. 12 illustrates the effects of the mixed LED lamps with the mixing proportion of from about 5:1 to about 1:5 on the efficiency of feed utilization of 45-day-old broiler chickens, i.e. the effect diagram of the present disclosure. The data show that Group G4B2, i.e. the mixed LED lamps of which the proportion of the green LED and the blue LED is 4:2 can increase the efficiency of feed utilization of the broiler chickens in the breeding period. The test shows that the mixed LED lamps with the proportion of 4:2 which can make the best of sensitivity reaction to green light and blue light reduces the ratio of feed to chicken and decrease the cost of feed, raising the production benefits. Besides, combination of green LED beads and blue LED beads on one lighting fixture by the proportion of 4:2 not only reduces the cost of light sources, but also saves the labor required for replacing light sources compared with using green light sources and blue light sources at different rearing stages. The cyan emitted by the light source produced by combining green LED beads and blue LED beads on one lighting fixture which is softer to human eyes not only contains the spectrum of blue light and green light conducive to the growth of chickens, but also is helpful for protecting human eyes.

Embodiment 3

In a chicken house, an evenly-distributed cyan light environment is created for rearing broiler chickens, there may be mixed LED lamps in the cyan light environment, the mixed LED lamp may be formed by combining green LED and blue LED on one lighting fixture, and the mixed LED lamps in the cyan light environment may be arranged as below:

Four mixed LED lamps with the luminous flux of $\phi=1140$ Lm may be mounted in a 105.0 m$^2$ (15.0 m×7.0 m) chicken house for breeding and arranged into a square array, the mounting height of the four mixed LED lamps is H=3.0 m, the initial mounting distance between two adjacent LED lamps is $\Delta I=3.0$ m and the maximum value is H tan $\alpha=3.5$ m when the distance between two adjacent LED lamps is $\Delta I=3.0$ m, $\alpha$, the viewing angle of a single mixed LED lamp, is equal to 50°, therefore the minimum illuminance E of the four mixed LED lamps on the ground is calculated to be 30 Lx according to the equation (1);

Substitute the illuminance value (15 Lx) required for the welfare rearing of broiler chickens in the chicken house for breeding which is equal to the minimum illuminance E obtained in the step above into the equation (2) to obtain the actual mounting distance L of 4.1 m between two adjacent mixed LED lamps;

If L (=4.1 m) is greater than H tan $\alpha$ (=3.5 m), reduce the mounting height H to be 2.5 m, repeat the Step 1) to 2) above to obtain L=2.6 m, L (=2.6 m) is less than the maximum mounting height H tan $\alpha$ (=2.9 m) after the mounting height H is reduced to 2.5 m, then arrange the four mixed LED lamps into a 2.6 m×2.6 m square array to create an evenly-distributed cyan light environment according to the actual mounting distance between two adjacent mixed LED lamps L (=2.6 m).

Carry out the green-blue mixed LED rearing test with the proportion of 1:5~5:1 by applying the well-distributed cyan light environment created as described above into the practical production of broiler chickens.

Seven experimental groups including G0B6, G1B5, G2B4, G3B3, G4B2, G5B1 and G6B0 may be set in the experiment, taking a group using the natural light as the control group. The ratios of green light LED to blue light LED in Group G0B6, G1B5, G2B4, G3B3, G4B2, G5B1 and G6B0 may be 0:6, 1:5, 2:4, 3:3, 4:2, 5:1 and 6:0 respectively.

As shown in Table 3, 240 1-day-old "plum blossom-yellow" hens may be divided at random into seven experimental groups, i.e. G0B6, G1B5, G2B4, G3B3, G4B2, G5B1, G6B0 and a control group using the natural light (30 hens in each group) for a 72-day fattening test. During the fattening period, totally-closed rearing is adopted, i.e. the chickens in the experimental groups may be exposed only to the light of the mixed LED lamps, the photoperiod is 18L:6D and the light intensity is controlled at 15 Luxm, while the control group receives the natural light and no additional light is provided at night till the end of the 72-day period.

TABLE 3

Seven Experimental Groups

| Proportion of green to blue | Color | Light intensity | Light regime |
| --- | --- | --- | --- |
| 0:6 | Blue | 15 Lux | 16L:8D |
| 1:5 | Cyan | | |
| 2:4 | Cyan | | |
| 3:3 | Cyan | | |
| 4:2 | Cyan | | |
| 5:1 | Cyan | | |
| 6:0 | Green | | |

Record the feed consumption of each experimental group every day, weigh the chickens in each experimental group regularly, and calculate the growth rate and the ratio of feed; at the end of the fattening period, slaughter and dissect the broiler chickens to obtain the entrails weight, leg weight, feet weight and abdominal fat weight so as to investigate the effects of the green-blue mixed LED lamps with the ratio of 1:5~5:1 on the growth rate and the ratio of chicken to feed of the broiler chickens in the fattening period. Make an analysis of variance for the data by using IBM SPSS Statistics 20 Software Suite. The significance level p=0.05 and the lowercase letters indicate that there may be significant difference in level.

Figure 17:
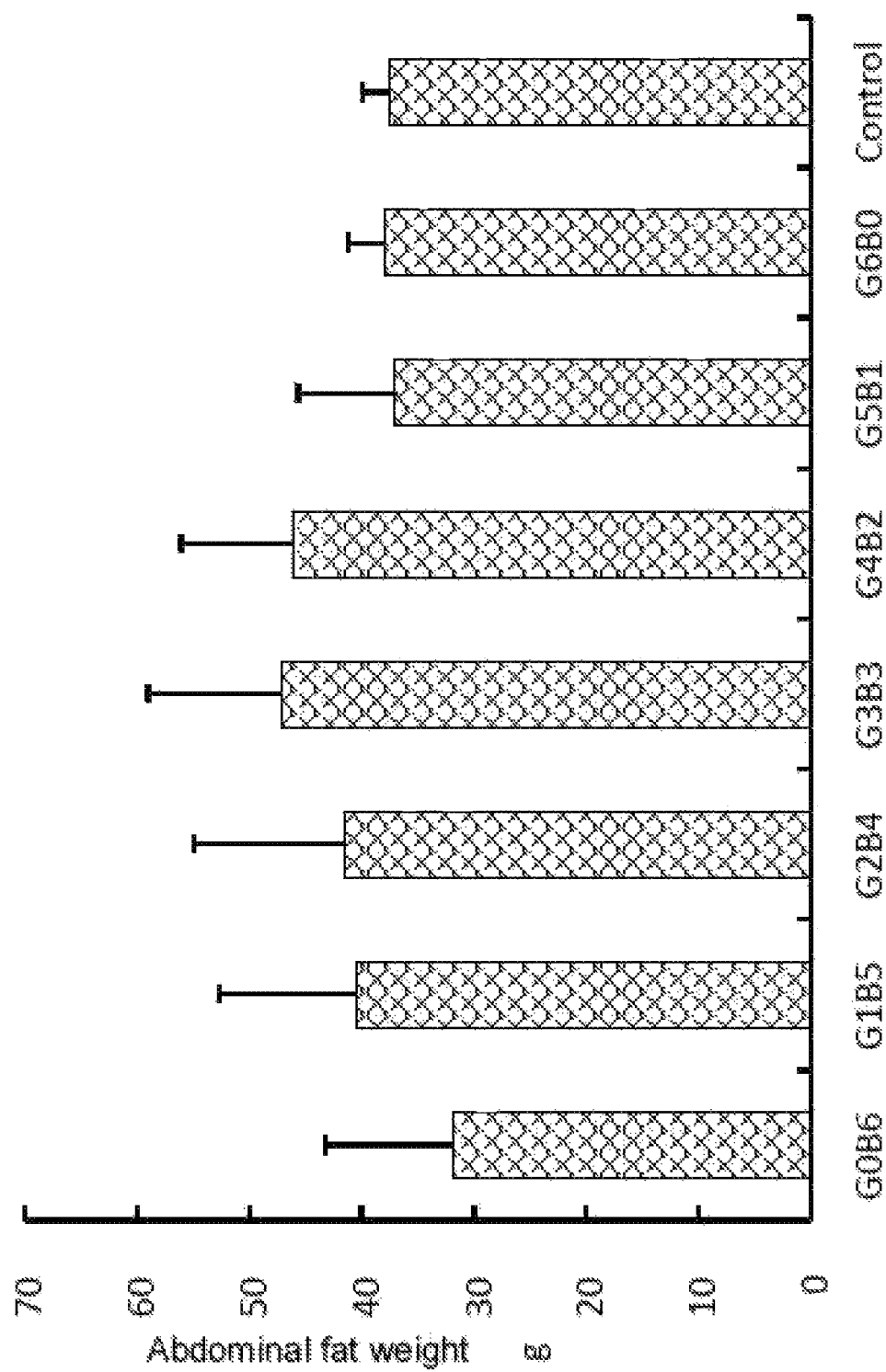
FIG. 17 is a diagram illustrating effects of mixed LED lamps with a mixing proportion of from about 5:1 to about 1:5 on an abdominal fat weight of chickens for sale (81 days old)

The results of the experiment may be as shown in FIGS. 13 to 17 which may be the effects of the mixed LED lamps with the mixing proportion of from about 5:1 to about 1:5 on the growth rate of 60-day-old and 72-day-old broiler chickens (FIG. 13); the effects of the mixed LED lamps with the mixing proportion of from about 5:1 to about 1:5 on the entrails weight of chickens for sale (81 days old) (FIG. 14); the effects of the mixed LED lamps with the mixing proportion of from about 5:1 to about 1:5 on the leg weight of chickens for sale (81 days old) (FIG. 15); the effects of the mixed LED lamps with the mixing proportion of from about 5:1 to about 1:5 on the feet weight of chickens for sale (81 days old) (FIG. 16); the effects of the mixed LED lamps with the mixing proportion of from about 5:1 to about 1:5 on the abdominal fat weight of chickens for sale (81 days old) (FIG. 17). The data show that Group G2B4, i.e. the mixed LED lamps of which the proportion of the green LED and the blue LED is 2:4 can increase the growth rate of the broiler chickens in the fattening period. Group G3B3 and G4B2, i.e. the mixed LED lamps of which the proportion of the green LED and the blue LED is 3:3 and 2:4 can increase the leg weight and the feet weight of the broiler chickens in the fattening period, increasing the production benefits. Group G5B1, i.e. the mixed LED lamps of which the proportion of the green LED and the blue LED is 5:1 can reduce the abdominal fat weight of the broiler chickens in the fattening period and increase the edible parts of broiler chickens. Mixed LED lamps with the proportion of 1:5~5:1 have some effect on the immune organs (such as spleen) and edible entrails (such as heart, liver and muscular stomach). A proportion that can significantly boost the immunity of broiler chickens and increase the weight of edible entrails will be found through optimization. The test shows that the mixed LED lamps with the proportion of 1:5~5:1 which can make the best of sensitivity reaction to green light and blue light increase growth rate (Group G2B4), leg weight and feet weight (Groups G3B3 and G4B2), and reduces the weight of abdominal fat (Group G5B1). Besides, combination of green LED beads and blue LED beads on one lighting fixture by the proportion of 1:5~5:1 not only reduces the cost of light sources, but also saves the labor required for replacing light sources compared with using green light sources and blue light sources at different rearing stages. The cyan emitted by the light source produced by combining green LED beads and blue LED beads on one lighting fixture which is softer to human eyes not only contains the spectrum of blue light and green light conducive to the growth of chickens, but also is helpful for protecting human eyes.

Figure 18:
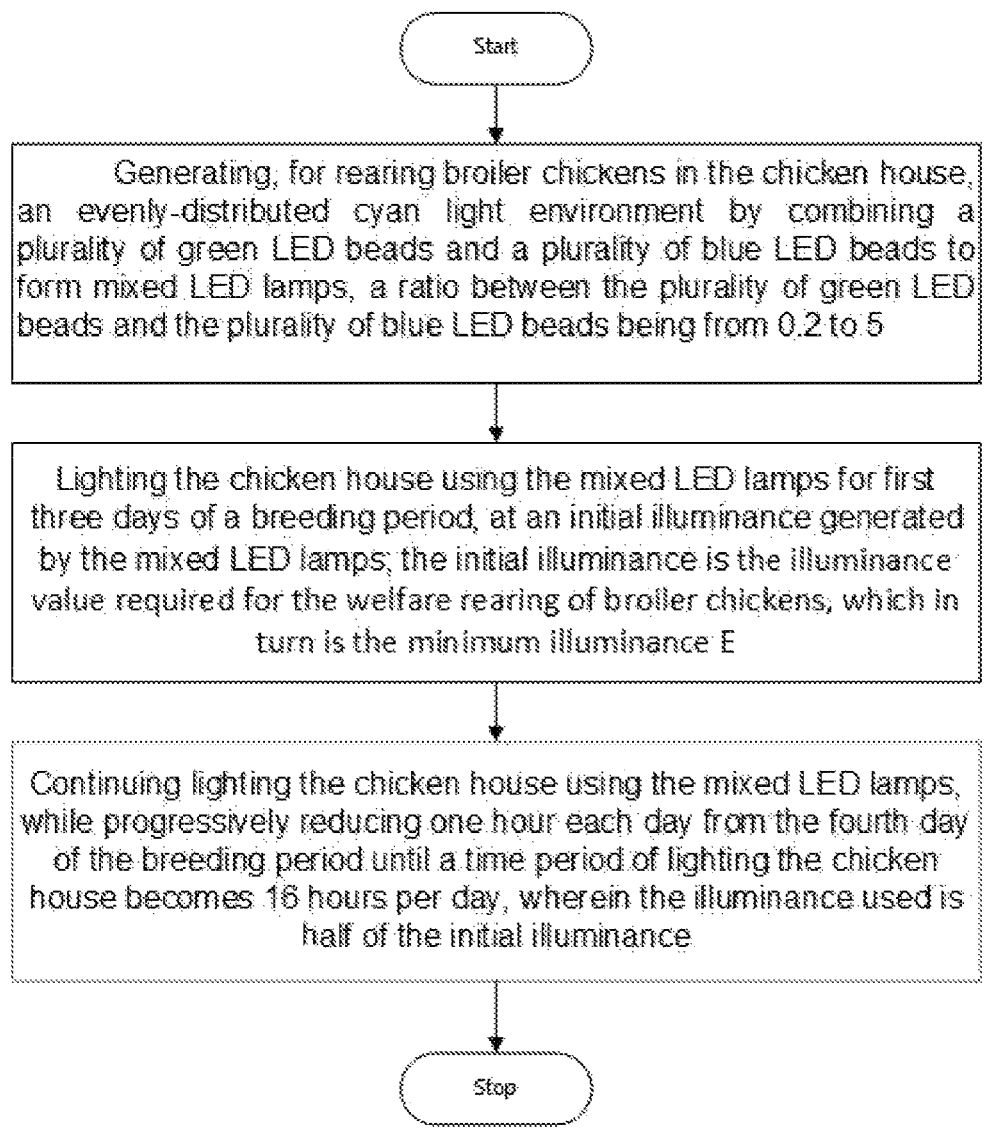
FIG. 18 is a flowchart showing steps of a method for lighting a chicken house using eye-friendly green-blue mixed LED lamps, according to one embodiment
Figure 19:
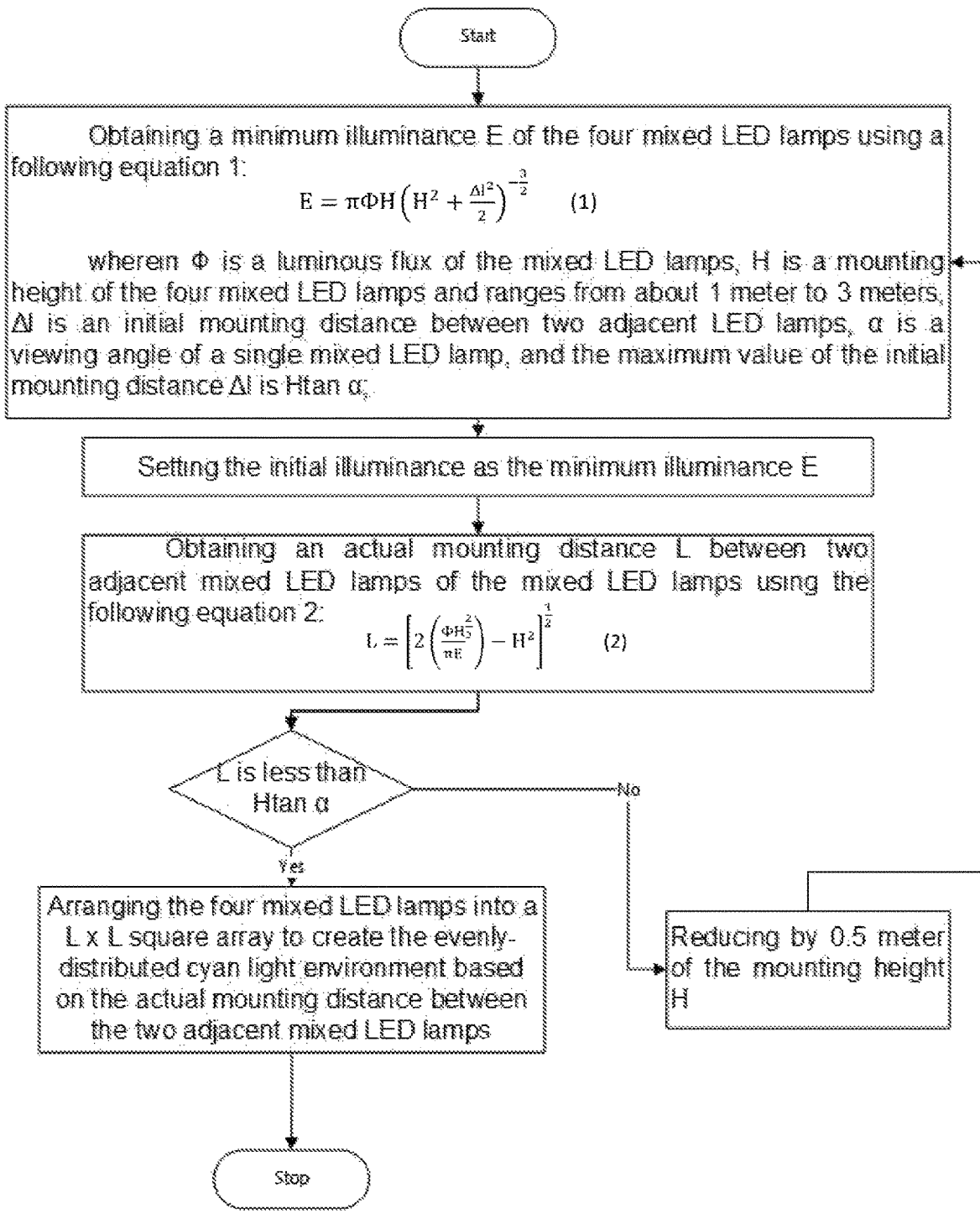
FIG. 19 is a flowchart showing steps of a method for lighting a chicken house using eye-friendly green-blue mixed LED lamps, according to another embodiment.

FIG. 18 and FIG. 19 further illustrate steps used in the method for lighting a chicken house using eye-friendly green-blue mixed LED lamps.

The embodiments above may be for describing the present disclosure and not intended to limit the present disclosure. Any modification and changes can be made to the present disclosure without deviating from the spirit and protection scope claimed in the claims, and these modifications and changes are covered by the protection scope of the present disclosure.

What is claimed is:

1. A method for lighting a chicken house using eye-friendly green-blue mixed LED lamps, the method comprising:
    generating, for rearing broiler chickens in the chicken house, an evenly-distributed cyan light environment by combining a plurality of green LED beads and a plurality of blue LED beads to form mixed LED lamps, a ratio between the plurality of the green LED beads and the plurality of the blue LED beads being from 0.2 to 5;
    lighting the chicken house using the mixed LED lamps for first three days of a breeding period, at an initial illuminance generated by the mixed LED lamps; and
    continuing lighting the chicken house using the mixed LED lamps, while progressively reducing one hour each day from the fourth day of the breeding period until a time period of lighting the chicken house becomes 16 hours per day, wherein the illuminance used is half of the initial illuminance.

2. The method of claim 1, wherein the mixed LED lamps comprise four mixed LED lamps mounted in the chicken house and arranged into a square array, and wherein the initial illuminance is determined by the following steps:

1, obtaining a minimum illuminance E of the four mixed LED lamps using a following equation 1:

$$E = \pi \Phi H \left( H^2 + \frac{\Delta l^2}{2} \right)^{-\frac{3}{2}} \quad (1)$$

wherein $\phi$ is a luminous flux of the mixed LED lamps, H is a mounting height of the four mixed LED lamps and ranges from about 1 meter to 3 meters, $\Delta I$ is an initial mounting distance between two adjacent LED lamps, $\alpha$ is a viewing angle of a single mixed LED lamp, and the maximum value of the initial mounting distance $\Delta I$ is H tan $\alpha$;

2, setting the initial illuminance as the minimum illuminance E; and 3, obtaining an actual mounting distance L between two adjacent mixed LED lamps of the mixed LED lamps using the following equation 2:

$$L = \left[ 2 \left( \frac{\Phi H^{\frac{2}{3}}}{\pi E} \right) - H^2 \right]^{\frac{1}{2}} \quad (2)$$

further comprising:
    arranging the four mixed LED lamps into a L×L square array to create the evenly-distributed cyan light environment based on the actual mounting distance between the two adjacent mixed LED lamps if L is less than or equal to the H tan $\alpha$; and
    if L is greater than H tan $\alpha$:
    reducing by 0.5 meter of the mounting height H and repeating the steps 1-3 until the actual mounting distance obtained is less than or equal to H tan $\alpha$, and arranging the four mixed LED lamps into a L×L square array to create the evenly-distributed cyan light environment.

3. The method of claim 1, wherein chickens may be exposed only to the light of the mixed LED lamps.

4. The method of claim 1, wherein the illuminance of the mixed LED lamps is controlled by a LED controller using a Pulse-Width Modulation (PWM) dimming mode.

5. A system for lighting a chicken house using eye-friendly green-blue mixed LED lamps, comprising:
    a power supply;
    a LED controller;
    a plurality of mixed LED lamps;
    an illuminance sensor; and
    a chicken house,
    wherein the plurality of mixed LED lamps are configured to be mounted in the chicken house, the LED controller is connected with the illuminance sensor and the plurality of mixed LED lamps, the power supply is connected to the LED controller for providing power, the illuminance sensor is configured to monitor the light intensity of the chicken house and is mounted on the ground of the chicken house, each of the mixed LED lamps is formed by combining a plurality of green LED beads and a plurality of blue LED beads under one lighting fixture at a ratio from 1:5 to 5:1, and a PWM dimming mode is adopted in the LED controller.

6. The system of claim 5, wherein the plurality of green LED beads and the plurality of blue LED beads are evenly and alternately arranged on a baseplate according to a shape choosing from the group consisting of a circle, a triangle, a rectangle, and a straight line.

7. The system of claim 5, wherein each of the mixed LED lamps is shaped as a bulb, a straight-tube or a square.

8. The system of claim 5, wherein the chicken house is configured such that chickens may be exposed only to the light of the mixed LED lamps.

9. The system of claim 5, wherein the plurality of the mixed LED lamps are mounted at a same height H in the chicken house and are arranged into a square array.

10. The system of claim 9, wherein a length L of the square array and the same mounting height H of the plurality of the mixed LED lamps satisfy the following equation (3), wherein φ is a luminous flux of the plurality of the mixed LED lamps (3):

$$L = \left[ 2\left(\frac{\Phi H^{\frac{2}{3}}}{\pi E}\right) - H^2 \right]^{\frac{1}{2}} \quad (3)$$

wherein, L satisfies an equation: L≤H tan α, α is a viewing angle of a single mixed LED lamp of the plurality of mixed LED lamps and a minimum illuminance value E satisfies a following equation (4):

$$E = \pi \Phi H \left( H^2 + \frac{\Delta l^2}{2} \right)^{-\frac{3}{2}} \quad (4)$$

wherein ΔI is an initial mounting distance between two adjacent mixed LED lamps of the plurality of the mixed LED lamps and a maximum value of ΔI is H tan α.

* * * * *